(12) United States Patent
Matsuzaki et al.

(10) Patent No.: US 9,700,951 B2
(45) Date of Patent: Jul. 11, 2017

(54) HEATER SENSOR COMPLEX WITH HIGH THERMAL CAPACITY

(71) Applicant: Hakko Corporation, Osaka (JP)

(72) Inventors: Kenji Matsuzaki, Osaka (JP); Hitoshi Takeuchi, Osaka (JP); Toshizaki Mochizuki, Osaka (JP)

(73) Assignee: HAKKO CORPORATION, Osaka (JP)

( * ) Notice: Subject to any disclaimer, the term of this patent is extended or adjusted under 35 U.S.C. 154(b) by 0 days.

(21) Appl. No.: 14/575,996

(22) Filed: Dec. 18, 2014

(65) Prior Publication Data

US 2017/0028497 A1 Feb. 2, 2017

Related U.S. Application Data

(60) Provisional application No. 62/003,952, filed on May 28, 2014.

(51) Int. Cl.
| | |
|---|---|
| *B23K 37/00* | (2006.01) |
| *B23K 3/02* | (2006.01) |
| *B23K 3/03* | (2006.01) |
| *G01K 7/02* | (2006.01) |
| *H05B 3/00* | (2006.01) |
| *B23K 3/08* | (2006.01) |

(52) U.S. Cl.
CPC ............. *B23K 3/026* (2013.01); *B23K 3/02* (2013.01); *B23K 3/03* (2013.01); *B23K 3/08* (2013.01); *G01K 7/02* (2013.01); *H05B 3/00* (2013.01)

(58) Field of Classification Search
CPC . B23K 3/026; B23K 3/08; B23K 3/02–3/053; H05B 3/00; G01K 7/02

USPC .............................. 228/51–55; 219/227–239
See application file for complete search history.

(56) References Cited

U.S. PATENT DOCUMENTS

| | | | | |
|---|---|---|---|---|
| 1,820,799 | A | | 7/1930 | Hazlett |
| 2,395,631 | A * | 2/1946 | Lew ..................... | A61B 18/082 |
| | | | | 219/230 |
| 2,518,265 | A * | 8/1950 | Adamson ............. | B23K 3/0338 |
| | | | | 219/239 |
| 2,582,481 | A * | 1/1952 | Dvorak ................. | B23K 3/033 |
| | | | | 136/228 |
| 2,717,952 | A * | 9/1955 | Dvorak ................. | B23K 3/033 |
| | | | | 219/236 |
| 2,724,042 | A * | 11/1955 | Adamson ............. | B23K 3/0361 |
| | | | | 219/239 |

(Continued)

FOREIGN PATENT DOCUMENTS

| | | |
|---|---|---|
| EP | 0386948 A1 | 12/1990 |
| GB | 191712 A * | 7/1923 ............... B22D 2/00 |

(Continued)

*Primary Examiner* — Kiley Stoner
(74) *Attorney, Agent, or Firm* — David B Abel (57) ABSTRACT

The invention is directed to designs for heater-sensor subassemblies for soldering cartridges and de-soldering cartridges for soldering systems. The designs provide a high thermal capacity and accurate tip temperature sensing and control features. The coil portion of the heater assembly is spaced proximally from the distal end of the subassembly to segregate the coil from the thermocouple temperature sensor. The solder cartridges include connector wires of dissimilar sizes and materials to couple the heater coil wire to the connections of a handle and the soldering station to reduce heat conduction to the handle.

20 Claims, 11 Drawing Sheets

(56) References Cited

U.S. PATENT DOCUMENTS

| | | | | |
|---|---|---|---|---|
| 2,735,923 A * | 2/1956 | Juvinall et al. | B23K 3/033 | 136/233 |
| 2,747,074 A * | 5/1956 | Finch | B23K 3/0361 | 136/228 |
| 2,897,335 A * | 7/1959 | Finch | B23K 3/033 | 219/236 |
| 2,908,793 A * | 10/1959 | Aloi | H01H 37/36 | 219/237 |
| 3,093,723 A * | 6/1963 | Adamson | B23K 3/0338 | 219/238 |
| 3,614,389 A * | 10/1971 | Malisza | A61C 13/0028 | 126/343.5 A |
| 3,646,577 A * | 2/1972 | Ernst | B23K 3/033 | 219/238 |
| 3,699,306 A * | 10/1972 | Finch | B23K 3/0338 | 219/236 |
| 3,707,258 A * | 12/1972 | Schlitt | B23K 3/0615 | 219/229 |
| 4,269,343 A * | 5/1981 | Siegel | B23K 1/018 | 219/230 |
| 4,278,828 A * | 7/1981 | Brixy | G01K 7/00 | 136/230 |
| 4,468,555 A * | 8/1984 | Adachi | B23K 3/03 | 219/237 |
| 4,544,829 A * | 10/1985 | Adachi | B23K 3/03 | 219/237 |
| 4,574,172 A * | 3/1986 | Burack | H05B 6/38 | 219/609 |
| 4,873,608 A * | 10/1989 | Yoshimura | B23K 3/0338 | 361/212 |
| 5,406,053 A * | 4/1995 | Masreliez | B23K 3/0315 | 219/229 |
| 5,837,973 A * | 11/1998 | Tamura | H05B 1/0213 | 219/229 |
| 5,889,257 A * | 3/1999 | Schader | A61C 13/0028 | 219/227 |
| 6,054,678 A * | 4/2000 | Miyazaki | B23K 3/033 | 219/229 |
| 6,087,631 A * | 7/2000 | Miyazaki | B23K 3/033 | 219/229 |
| 6,257,758 B1 * | 7/2001 | Culbertson | G01K 1/143 | 374/120 |
| 7,004,626 B1 * | 2/2006 | Giberson | G01K 7/02 | 136/230 |
| 7,592,572 B2 * | 9/2009 | Schlipf | H05B 3/04 | 174/102 P |
| 2002/0023909 A1 * | 2/2002 | Usui | A61C 13/0028 | 219/236 |
| 2004/0206740 A1 * | 10/2004 | Miyazaki | B23K 3/033 | 219/229 |
| 2005/0092729 A1 * | 5/2005 | Konishi | B23K 1/012 | 219/229 |
| 2008/0010808 A1 | 1/2008 | Shigekawa | | |
| 2008/0205483 A1 * | 8/2008 | Rempe | G01K 7/02 | 374/179 |
| 2012/0024834 A1 * | 2/2012 | Kaylor | B26F 3/08 | 219/229 |
| 2013/0259090 A1 * | 10/2013 | Schlipf | G01K 1/14 | 374/179 |
| 2014/0211830 A1 * | 7/2014 | Saito | G01K 7/02 | 374/179 |
| 2015/0323392 A1 * | 11/2015 | Mori | G01K 7/02 | 374/165 |
| 2016/0231181 A1 * | 8/2016 | Maruko | H01L 35/02 | |

FOREIGN PATENT DOCUMENTS

| | | | | |
|---|---|---|---|---|
| GB | 536918 A * | 5/1941 | | B23K 3/0353 |
| JP | 58147621 A * | 9/1983 | | G01K 7/02 |
| JP | 03008566 A * | 1/1991 | | B23K 3/033 |
| JP | 10260083 A * | 9/1998 | | B23K 3/033 |
| JP | 2004314111 A * | 11/2004 | | B23K 3/033 |
| JP | 2006-150365 A | 6/2006 | | |
| JP | 2006150365 A * | 6/2006 | | B23K 3/0338 |
| JP | KR 20140039987 A * | 4/2014 | | H01L 21/67248 |

* cited by examiner

|  | Nipple (Resin) | | Insulation cover (Rubber) | | | Handpiece |
| --- | --- | --- | --- | --- | --- | --- |
|  | A | B | C | D | E | F |
| 150W class | 74.6 | 56.0 | 48.5 | 41.2 | 33.6 | 28.8 |
| 300W class with Ni 0.7mm | 65.5 | 56.9 | 44.6 | 40.4 | — | — |
| 300W class Kanthal 0.8mm | 89.0 | 76.8 | 58.5 | 52.8 | — | — |

FIG. 23

HEATER SENSOR COMPLEX WITH HIGH THERMAL CAPACITY

BACKGROUND OF THE INVENTION

Field of the Invention

The present invention relates to a heater and tip assembly for use in soldering and desoldering systems. More specifically, the present invention relates to a heater-sensor subassembly for a soldering iron or desoldering tool for use environments requiring a soldering tip or desoldering tip with a high thermal capacity adapted for use in working electrical components designed to allow high current utilization.)

Descriptions of Related Art

Certain specialty automobile electrical parts for use in Electric Vehicles (EVs) and Hybrid Electric Vehicles (HEVs) as well as power supply components such as power conditioners used in solar power generation require very high thermal capacity when soldering because the required current flow to heat the soldering device is very high, and the parts to be soldered, sometimes referred to as the land of the substrate, are generally large and as a result the parts have a high thermal capacity.

Therefore, in the field of soldering large parts that are designed for high currents, there is a problem in that the solder does not melt properly, or workability is very bad with conventional soldering equipment. The heater sensor complex with high thermal capacity is required because heater sensor complex can be fabricated with 2 leads with sensing function.

Figure 1:
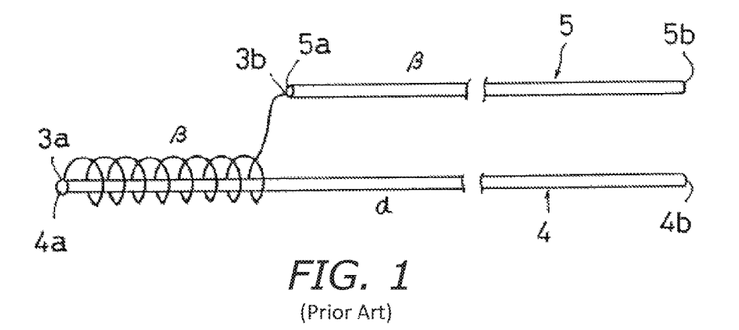
FIG. 1 is a schematic drawing of a prior art heater-sensor complex for a soldering cartridge.
Figure 2:
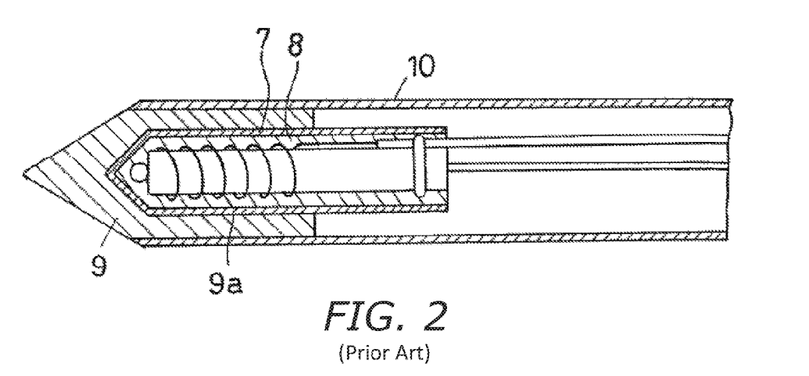
FIG. 2 is a schematic drawing of the distal end portion of a prior art soldering cartridge using the heater-sensor complex of FIG. 1.

An exemplary prior art soldering iron heater assembly described in U.S. Pat. No. 6,054,678 (Japanese Patent 3124506), hereby incorporated by reference, is depicted in FIGS. 1 and 2. The principal part of the soldering iron heater according to the prior art included a cylindrical insulating pipe having an axial bore and a heater-sensor complex mounted thereon. The insulating pipe may, for example, be an alumina pipe. FIG. 1 to illustrates the main components of the prior art heater-sensor complex, including a distal tip of a coil-shaped heating wire 3 welded to a distal tip of a linear non-heating wire 4 by argon welding. The base or proximal end of the heating wire 3 is welded to a linear non-heating wire 5. The heating wire 3 was made of iron-chromium alloy. Among such iron-chromium alloys, kanthal D (a kanthal wire manufactured by Kanthal Co.) was preferred. The proportions of its principal constituent elements are Cr=22.0 and Al=4.8. Such alternative compositions as Cr=22.0, Al=5.8, Cr=22.0, Al=5.3, and Cr=20.0, Al=4.0 can also be employed.

FIG. 2 depicts the heater-sensor complex of FIG. 1 as configured in a soldering iron tip assembly. The non-heating wire 4 is passed into and through the bore of an insulating pipe and the heating wire 3 is wound around the periphery of the insulating pipe forming a coil, with the respective distal ends secured together to form a thermocouple. The coil is secured to the insulating pipe and then the heater assembly including the thermal couple is inserted into and secured within a tip 9, having an axial bore that extends over the coil portion of the heater assembly to conduct heat to the distal end of the tip 9. In this configuration, the thermocouple is used to determine the tip temperature 1 and the coil is positioned as close as possible to the distal end of the tip.

Figure 3:
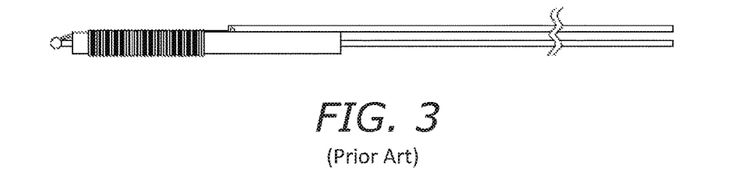
FIG. 3 is a mechanical drawing of components of a heater-sensor sub-assembly that embodied the design of the prior art of FIGS. 1 and 2 used with conventional 70 W soldering systems.

FIG. 3 depicts a mechanical drawing of an exemplary heater-sensor complex made according to the teachings of the a prior art of FIGS. 1 and 2, depicting the coil having a length of about 10.5 mm extending proximally from a position about 1.5 mm from the distal end of the insulating pipe and within 3.5 mm of the end of the thermocouple. This assembly was configured for use in the handle assembly as depicted in FIG. 7 of the U.S. Pat. No. 6,054,678. The products made according to the design have been well received in the marketplace and as a result there are a substantial number of power stations and handles for use with the cartridges having the design in use in the industry. The configuration is very well adapted to use with small works, such as electrical circuit boards and fine wire electrical components. These types of works require precise temperature control of the soldering tip, and rapid heating of the tip by the application of power to the coil.

While the configuration according to the prior art U.S. Pat. No. 6,054,678 has been very well received and exceptionally adapted for use with small works, the soldering cartridges are not as well suited for use with large works, as for example the electrical parts for use in EVs and HEVs as well as power supply components such as power conditioners used in solar power generation. Accordingly, the present invention contemplates a soldering cartridge design and heater-sensor assembly having a very high thermal capacity for use with works having large surface areas, and which are useable with the installed base of soldering stations configured for use with the cartridges of the prior design.

SUMMARY OF THE INVENTION

The present invention discloses several designs for heater-sensor complexes or sub-assemblies for soldering cartridges and de-soldering systems having a high thermal capacity and accurate tip temperature sensing and control features. In the configurations of the present invention, the coil portion of the heater assembly is spaced proximally from the distal end of the subassembly to segregate the coil from the thermo-couple temperature sensor. A solder tip for the cartridge may extend proximally to include a thick annular section surrounding the coil portion of the heater assembly to provide a high thermal capacity. The solder cartridges may include connector wires of dissimilar sizes and materials to couple the heater coil wire to the connections of a handle and the soldering station to reduce heat conduction to the handle.

BRIEF DESCRIPTION OF THE FIGURES

FIG. 7 A, B are perspective views of a plug base for positioning the proximal ends of the return wire and conductor within the insulating pipe according to the present invention;

DETAILED DESCRIPTION OF THE INVENTION

The design of the prior art heater-sensor sub-assembly and cartridge tip according to the prior art is described above with respect to FIGS. 1-3, and in detail in the U.S. Pat. No. 6,054,678 incorporated by reference herein. The design of the prior art heater-sensor sub-assembly for a soldering cartridge configured for use with a 70 Watt (W) power source is depicted in FIG. 3.

Figure 4:
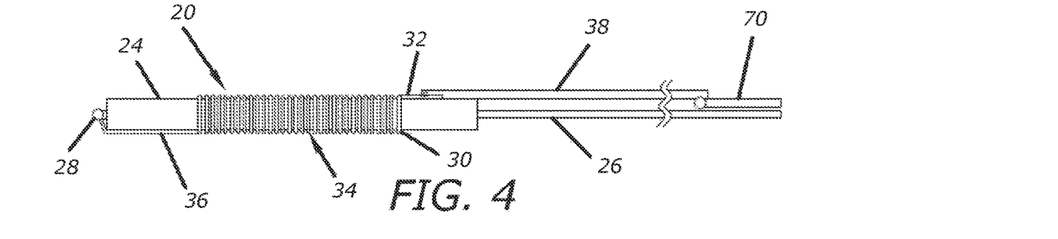
FIG. 4 is a mechanical drawing of components of a heater-sensor sub-assembly according to the present invention.
Figure 5:
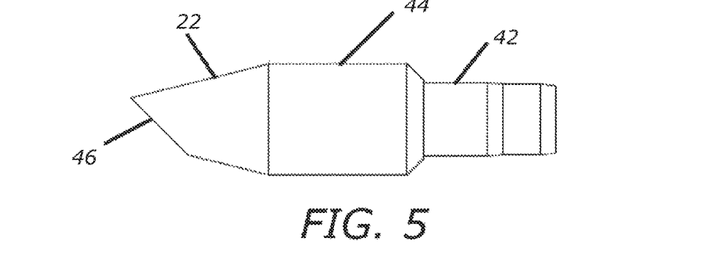
FIG. 5 is side view drawing of the heat conducting tip of the soldering cartridge according to the present invention.

A solder cartridge according to the present invention includes a heater-sensor sub-assembly 20 according to a first embodiment of the present invention depicted in FIG. 4, and its associated heat conducting tip 22 is depicted in FIG. 5. The heater-sensor sub-assembly 20 includes an insulating pipe 24, return wire 26, thermocouple 28 and a heater wire 30. The heater wire 30 has a proximal portion 32 extending from a proximal location on the insulating pipe 24 to a coil 34, and a distal portion 36. The coil 34 is wound around the insulating pipe 24. The insulating pipe 24 preferably has an axial length about twice the axial length of the coil 34, and the coil 34 is positioned along the center of the insulating pipe 24. By this configuration, the distal end of the coil 34 is spaced from the distal end of the insulating pipe a length of about one-half the length of the coil 34. Accordingly, the length of the distal portion 36 of the heater wire 30 is about one-half the axial length of the coil 34.

The heater wire 30 is preferably formed from an iron-chromium alloy wire material, such as "Kanthal" brand wire available from Sandvik Materials Technology based in Sweden. The heater wire 30 preferably has a 0.3 mm to 0.45 mm diameter and the coil 34 has thirty to thirty-two windings and a length of about 18 mm to 20 mm. The heater wire 30 is connected at its proximal portion 32 to a conductor 38, which extends proximally and roughly parallel to the return wire 26. The conductor 38 is preferably formed from the same material as the heater wire 30, however, the conductor preferably has a diameter of 0.8 mm to 1.2 mm, or about 3 times the diameter of the heater wire 30. This configuration results in the heat generation upon application of an alternating current from a power supply to be localized within the coil 34.

FIG. 4 also depicts that it is contemplated that the proximal end of the conductor 38 may be welded to another axially extending connector wire 70 having a smaller diameter. The example the 1.2 mm diameter conductor 38 could be coupled to a 0.7 mm connector wire 70 formed from a metallic material having a lower volume resistivity than the conductor 38 to reduce excess heat generation, or the same material as return wire 26 or from a nickel or nickel alloy material.

The heater-sensor sub-assembly 20 has the non-heating return wire 26 extending axially through the insulating pipe 24 to the distal end of the insulating pipe 24, where the distal tip of the return wire 26 is welded to the distal tip of the heater wire 30. The return wire 26 is preferably formed from a nickel material having a diameter of 0.6 mm being preferred, however, a larger diameter wire can be used. Welding the nickel material of the return wire 26 to the iron-chromium alloy material of the heater wire 30 forms the thermocouple 28, which acts as a temperature sensor.

Figure 6:
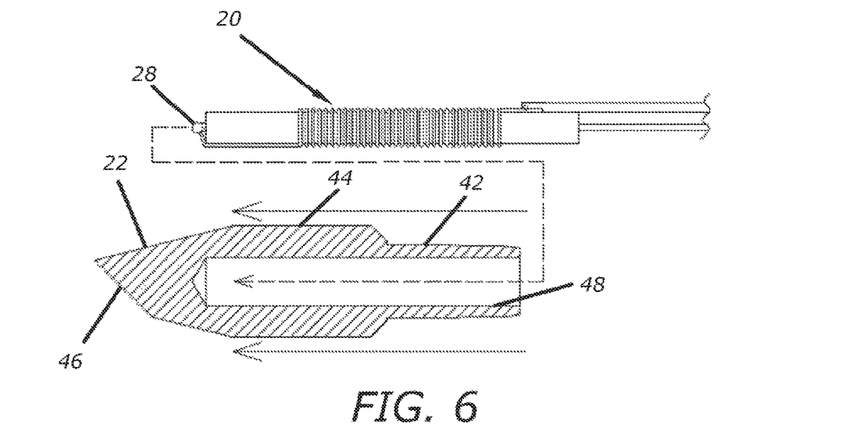
FIG. 6 is a mechanical drawing of the heater-sensor assembly and a cross section of the heat conducting tip having an axial bore into which the heater-sensor assembly is inserted for the soldering cartridge according to the present invention.

FIG. 5 depicts a side view of the heat conducting tip 22. The heat conducting tip 22 is preferably formed from a material having high thermal conductivity, such as copper, iron or an iron alloy. FIG. 6 shows a cross sectional view of the heat conducting tip 22 as well as the heater-sensor sub-assembly 20. As illustrated in the depictions in FIG. 5 and FIG. 6, the heat conducting tip 22 has a first sleeve portion 42, a central portion 44 and a tip end 46. The heat conducting tip 22 has an axial bore 48 extending through the first sleeve portion 42, central portion 44 and into a portion of the tip end 46, although the majority of the tip end 46 is solid. The axial bore 48 is generally cylindrical with the distal end of the axial bore 48 forming a cone shaped indent into the center of the tip end 46 to accept the thermocouple 28 when the heater-sensor sub-assembly 20 is inserted into the axial bore 48 of the heat conducting tip 22.

The heat conducting tip 22 is sized so that when the heater-sensor sub-assembly 20 is inserted into the axial bore 48, first sleeve portion 42 surrounds the proximal half of coil 34 and the central portion 44 surrounds the distal half of the coil 34 as well as the exposed distal end of the insulating pipe 24. The central portion has a larger outer diameter than the first sleeve portion 42, to provide a high thermal mass. The heat conducting tip 22 may include beveled or rounded transitions between the respective outer sections. However, the configuration is intended to promote the flow of heat from the portions of the heat conducting tip 22 surrounding the coil 34 distally to the tip end 46.

The design according to FIGS. 4, 5 and 6 is adapted for use as a high thermal capacity soldering cartridge powered by a 300 W power supply. The design according to FIGS. 4, 5 and 6 provides suitable thermal properties for large work soldering and accurate temperature control while avoiding heat influence from the coil 34 on the thermocouple 28, thereby allowing accurate feedback control by the use of the thermocouple 28 as a tip temperature sensor.

In a preferred embodiment, the insulating pipe 24 preferably has an axial length of about 35 mm to 40 mm and the axial length of the coil 34 is about 19 mm. In this embodiment, the distal end of the coil 34 is positioned about 10 mm from the thermocouple 28. Also, the proximal end of the heating wire 30 is welded to a conductor 38 having a diameter 2 to 4 times that of the diameter of the heater wire 30. The proximal end of the conductor 38 may be secured to a smaller diameter connector wire 70 formed from a different material such as nickel or a nickel alloy.

Figure 7A:
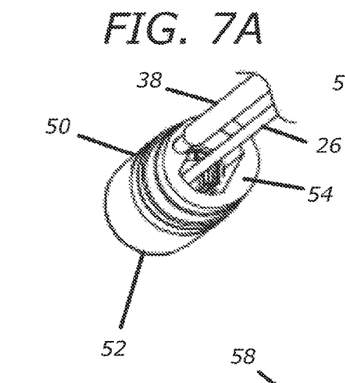
Figure 7B:
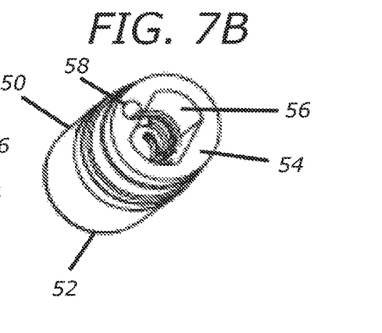
Figure 8:
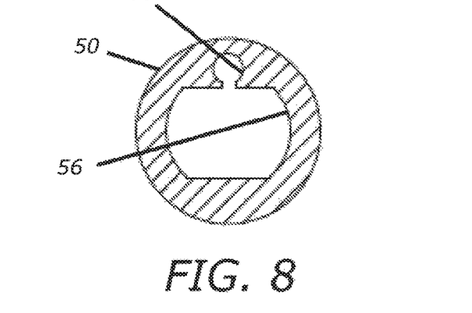
FIG. 8 is a cross sectional end view of a plug base for positioning the return wire and conductor within the insulating pipe according to the present invention.

FIGS. 7A, 7B and 8 depict a perspective view and cross sectional view, respectively, of a plug base 50. The plug base 50 as shown in FIGS. 7A and 7B is configured to have a distal end 52 and a proximal end 54 that may be inserted into or abut a stainless steel pipe (not shown). The plug base 50 is preferably formed from a polyamide material. The plug base 50 has an axial, part cylinder shaped cutout section 56 and a generally cylindrical shaped cutout 58 offset from the axis of the plug base 50. The conductor 38 is sized to fit into the cutout 58 while the return wire 26 is positioned coaxially in the center of the plug base 50 as shown in FIG. 7A.

Figure 9:
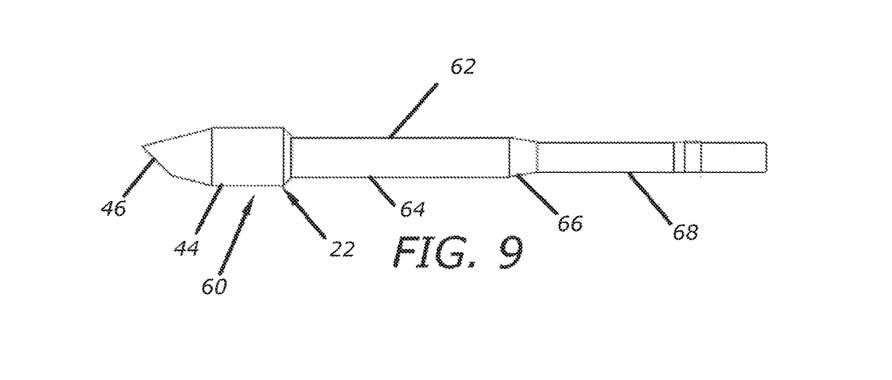
FIG. 9 is a schematic side view drawing of a soldering cartridge according to the present invention.

FIG. 9 is a side view of the assembled solder cartridge 60 of the present invention. As depicted in FIG. 9, the solder cartridge has the central portion 44 and a tip end 46 of the heat conducting tip 22 at the distal end of the solder cartridge 60. The first sleeve portion 42 (not shown) of the heat conducting tip 22 is encased in a housing 62. The housing 62 may have a first diameter portion 64 at its distal end sized so as to securely receive the first sleeve portion 42 of the heat conducting tip 22, a tapering portion 66 near its center where the plug base 50 is located, and a proximal cylindrical section 68 having an outer diameter properly dimensioned to a diameter of about 5.5 mm for use in existing handles. The proximal cylindrical section 68 may also include electrical contacts for interconnecting the proximal ends of the return wire 26 and conductor 38 to electrical contacts in the handle (not shown). The housing 62 is preferably formed from stainless steel to provide rigidity and yet not conduct heat proximally toward the handle.

Figure 10:
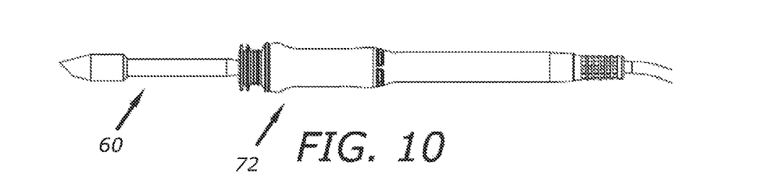
FIG. 10 is a side view drawing of a soldering cartridge of the present invention and a handle for the soldering cartridge.

FIG. 10 depicts the solder cartridge 60 with the proximal cylindrical section 68 of the housing 62 inserted into a standard handle 72. As depicted, the reduced diameter of the proximal cylindrical section 68 of the housing 62 is necessary to allow the cartridge 60 to be used with existing handles. It is contemplated that the handle may be redesigned to receive a larger diameter cartridge, whereby the housing 62 of the solder cartridge 60 may be formed of a uniform diameter tube.

Figure 11:
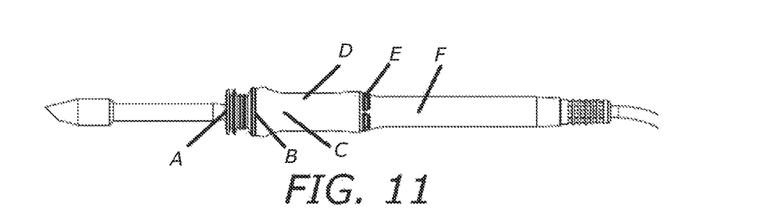
FIG. 11 is a side view drawing of a soldering cartridge according to an embodiment of the present invention inserted into a handle to identify various temperature measurement locations.

FIG. 11 depicts a standard solder cartridge inserted into a handle with positions A-F on the handle identified where sensors were positioned to allow measurements of temperatures at various locations for the solder cartridges of the present invention. The measurements of the respective temperatures for the various cartridges are tabulated in table 1, discussed below.

Figure 12:
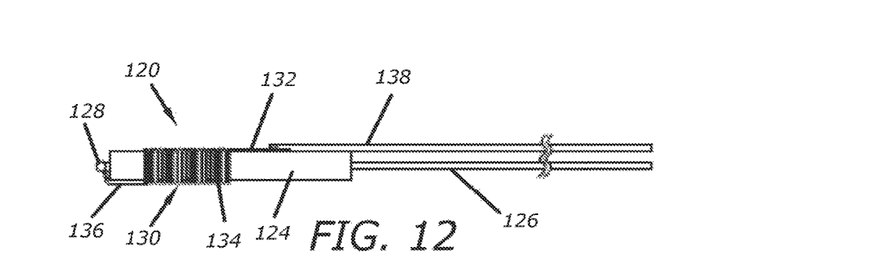
FIG. 12 is a mechanical drawing of components of a heater-sensor sub-assembly according to a conventional 150 W soldering system application.

FIG. 12 depicts a conventional 150 W soldering system heater-sensor sub-assembly 120. The heater-sensor sub-assembly 120 has the non-heating return wire 126 extending axially through the insulating pipe 124 to the distal end of the insulating pipe 124, where the distal tip of the return wire 126 is welded to the distal tip of the heater wire 130. The return wire 126 is preferably formed from a nickel material having a diameter of 0.6 mm being preferred, however, a larger diameter wire can be used. Welding the nickel material of the return wire 126 to the iron-chromium alloy material of the heater wire 130 forms the thermocouple 128, which acts as a temperature sensor. The heater wire 130 has a proximal portion 132 extending from a proximal location on the insulating pipe 124 to a coil 134, and a distal portion 136. The coil 134 is wound around the insulating pipe 124. The insulating pipe 124 preferably has an axial length about twice the axial length of the coil 134. In this embodiment, the coil 134 is positioned from the center of the insulating pipe 124 distally 8 to 10 mm, ending about 5 mm from the thermocouple 128. The proximal end of the heating wire 130 is welded to a conductor 138 having a diameter two to four times that of the diameter of the heater wire 130.

Figure 13:
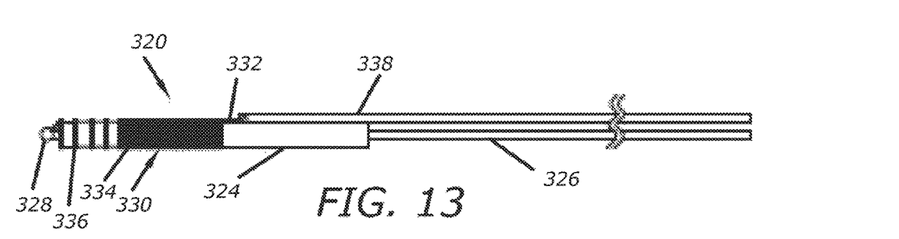
FIG. 13 is a mechanical drawing of components of a heater-sensor sub-assembly for a 70 W soldering system cartridge of the present invention.

FIG. 13 depicts an improved version of a 70 W solder system heater-sensor sub-assembly 320. The heater-sensor sub-assembly 320 has the non-heating return wire 326 extending axially through the insulating pipe 324 to the distal end of the insulating pipe 324, where the distal tip of the return wire 326 is welded to the distal tip of the heater wire 330. The return wire 326 is preferably formed from a nickel material having a diameter of 0.6 mm being preferred, however, a larger diameter wire can be used. Welding the nickel material of the return wire 326 to the iron-chromium alloy material of the heater wire 330 forms the thermocouple 328, which acts as a temperature sensor. The heater wire 330 has a proximal portion 332 extending from a proximal location on the insulating pipe 324 to a coil 334, and a distal portion 336. The coil 334 is wound around the insulating pipe 324. The insulating pipe 324 preferably has an axial length of about 25 mm to 30 mm and the axial length of the coil 334 is about 8 mm. In this embodiment, the distal end of the coil 334 is positioned about 6.5 mm from the thermocouple 328. The proximal end of the heating wire 330 is welded to a conductor 338 having a diameter two to four times that of the diameter of the heater wire 330. Between the thermocouple 328 at the distal end of the insulating pipe 324 and the distal end of the coil 334, the heater wire may have a wider pitch of 1.2 mm for the last four windings.

Figure 14A:
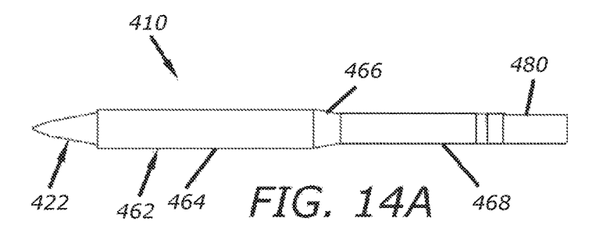
FIGS. 14A and 14B provide a side view and cross sectional view of an alternative embodiment of the soldering cartridge according to a conventional 150 W soldering system.
Figure 14B:
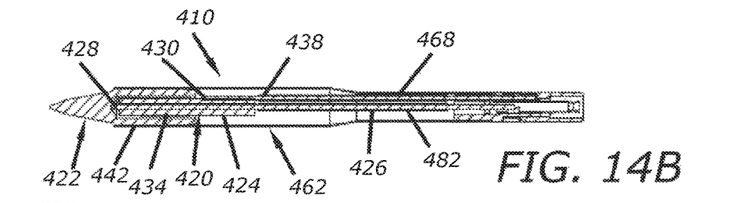

FIGS. 14A and 14B depicts a heater-sensor sub-assembly 420 as components of a conventional 150 W solder cartridge 410 depicted in a side view (FIG. 14A) and in a side-cross sectional view (FIG. 14B). In the side view of FIG. 14A, the distal tip portion of the heat conducting tip 422 at the distal end of the solder cartridge 410 is depicted extending from the housing 462. The housing 462 includes a distal cylindrical section 464 and a proximal cylindrical section 468 and a central transition 466 there-between. The proximal cylindrical section 468 terminates at a connector assembly 480.

The housing 462 is preferably made from a rigid metallic material with low heating conducting capacity such as stainless steel.

As depicted in the cross sectional view of FIG. 14B, the heat conducting tip 422 includes a sleeve portion 442 having a hollow cylindrical cross section that is press fit into the inner diameter of the distal cylindrical section 464 of the housing 462. The sleeve portion 442 of the heat conducting tip 422 encases the distal end of the heater-sensor sub-assembly 420, with the proximal end of the sleeve portion 442 extending at least to the proximal end of a coil 434 portion of the heater wire 430 of the heater-sensor sub-assembly 420. As described with respect to the heater-sensor sub-assembly embodiments above, the distal end of the coil 434 is spaced from the thermocouple 428 at the distal tip of the heater-sensor sub-assembly by a length of about one-half the axial length of the coil 434. The coil 434 is wrapped about an insulating pipe 424. The return wire 426 passing axially through the insulating pipe 424 is preferably formed from a nickel material having a diameter of 0.6 mm being preferred, however, a larger diameter wire can be used. The heating wire 430 is preferably formed from a 0.3 mm iron-chromium alloy material. The proximal end of the heating wire 430 is welded to a conductor 438, also preferably formed from an iron-chromium alloy material, but preferably having a diameter 0.8 mm so that heat generated at the coil 434 is localized to the vicinity of the coil 434 because of the smaller diameter the heater wire 430 as compared to the diameter of the conductor 438. The conductor 438 and the return wire 426 may be enclosed inside of an insulating tube 482 made of a polytetrafluoroethylene or polyimide material within the proximal cylindrical section 468 of the housing 462.

Figure 15:
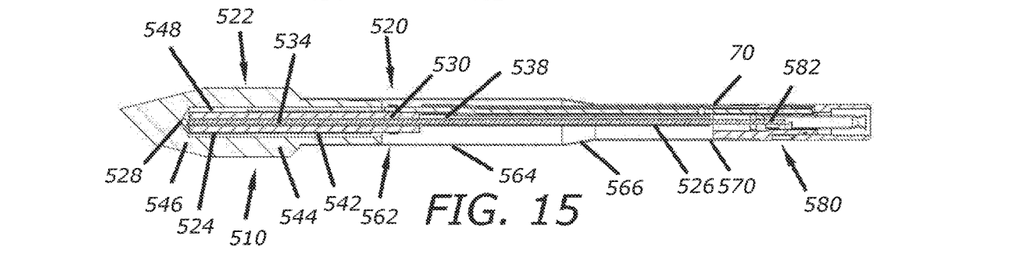
FIG. 15 is side view and cross sectional view of an embodiment of the soldering cartridge according to an embodiment of the present invention.

FIG. 15 depicts an embodiment of a heater-sensor sub-assembly 520 of the present invention as components of a 300 W solder cartridge 510 depicted in side-cross sectional view FIG. 15. The distal tip portion of the heat conducting tip 522 at the distal end of the solder cartridge 510 is depicted extending from the housing 562. The housing 562 includes a first distal cylindrical section 564, a transitional section 566 and a proximal cylindrical section 570. The proximal cylindrical section 570 terminates at a connector assembly 580. The housing 562 is preferably made from a rigid metallic material with low heating conducting capacity such as stainless steel.

As depicted in the cross sectional view of FIG. 15, the heat conducting tip 522 has a first sleeve portion 542, a central portion 544 and a tip end 546. The heat conducting tip 522 has an axial bore 548 extending through the first sleeve portion 542, central portion 544 and into a portion of the tip end 546, although the majority of the tip end 546 is solid. The axial bore 548 is generally cylindrical with the distal end of the axial bore 548 forming a cone shaped indent into the center of the tip end 546 to accept a thermocouple 528 when the heater-sensor sub-assembly 520 is inserted into the axial bore 548 of the heat conducting tip 522.

The heat conducting tip 522 is sized so that when the heater-sensor sub-assembly 520 is inserted into the axial bore 548, first sleeve portion 542 surrounds the proximal half of coil 534 and the central portion 544 surrounds the distal half of the coil 534 as well as the exposed distal end of the insulating pipe 524. The central portion 544 has a larger outer diameter than the first sleeve portion 542, to provide a high thermal mass. The heat conducting tip 522 may include beveled or rounded transitions between the respective outer sections. However, the configuration is intended to promote the flow of heat from the portions of the heat conducting tip 522 surrounding the coil 534 distally to the tip end 546.

As described with respect to the heater-sensor sub-assembly embodiments above, the distal end of the coil 534 is spaced from the thermocouple 528 at the distal tip of the heater-sensor sub-assembly. The coil 534 is wrapped about an insulating pipe 524. The return wire 526 passing axially through the insulating pipe 524 is preferably formed from a nickel material having a diameter of 0.6 mm being preferred, however, a larger diameter wire can be used. The heating wire 530 is preferably formed from a 0.4 mm to 0.45 mm iron-chromium alloy material. The proximal end of the heating wire 530 is welded to a conductor 538, also preferably formed from an iron-chromium alloy material, but preferably having a diameter 1.2 mm so that heat generated at the coil 534 is localized to the vicinity of the coil 534 because of the smaller diameter the heater wire 530 as compared to the diameter of the conductor 538. The conductor 538 is connected at a proximal end to a connector wire 70 preferably made of a metallic material having lower volume resistivity than the conductor 538, or nickel or nickel alloy. The connector wire 70 and the return wire 526 may be enclosed inside of an insulating tube 582 made of a polyimide or polytetrafluoroethylene material. The insulating tube 582 is positioned within the proximal cylindrical section 570 of the housing 562. The connector wire 70 and the return wire 526 terminate in a coupling assembly 580.

Figure 16:
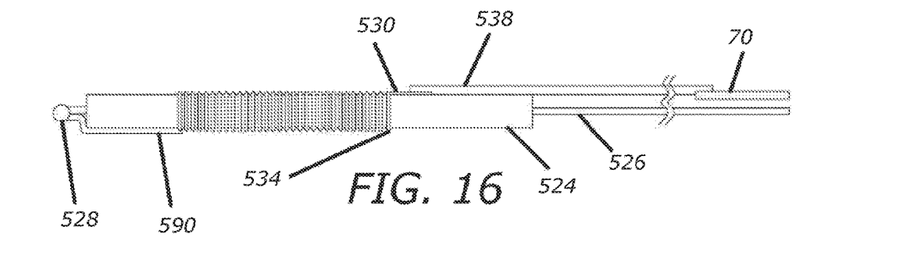
FIG. 16 is another alternative embodiment of the heater-sensor subassembly for the soldering cartridge according to the present invention

FIG. 16 depicts an alternative embodiment of the heater-sensor sub-assembly that may be used in the soldering cartridge 510. The heater-sensor sub-assembly of FIG. 16 includes the heating wire 530 and its coil 534 wound about an insulating pipe 524. The proximal end of the heating wire 530 is welded to a larger diameter conductor 538 made from the same material as the heating wire 530. Preferably, the heating wire 530 is a 0.4 mm to 0.45 mm diameter iron-chromium alloy and the conductor 538 is a 1.2 mm diameter iron-chromium alloy. The distal end of the coil 534 is spaced 10 mm to 12 mm from a thermocouple 528 at the distal tip of the heater-sensor sub-assembly. The heating wire 530 is connected to a distal wire 590 made of the same material as the material of the heating wire 530, thus preferably an iron-chromium alloy, but having a larger diameter than that of the heating wire 530. Thus, for a heating wire having a preferred diameter of 0.4 mm, the distal wire 590 has a preferred diameter of at least 0.5 mm, and preferably in the range 0.5 mm to 0.7 mm. The larger diameter of the distal wire 590 reduces heat generation within distal wire 590 and also reduces heat transfer from the coil 534 to the thermocouple 528 along the distal wire 590. Also as depicted in FIG. 16, the conductor 538 is connected at a proximal end to a connector wire 70 preferably made of a nickel or nickel alloy.

Figure 17:
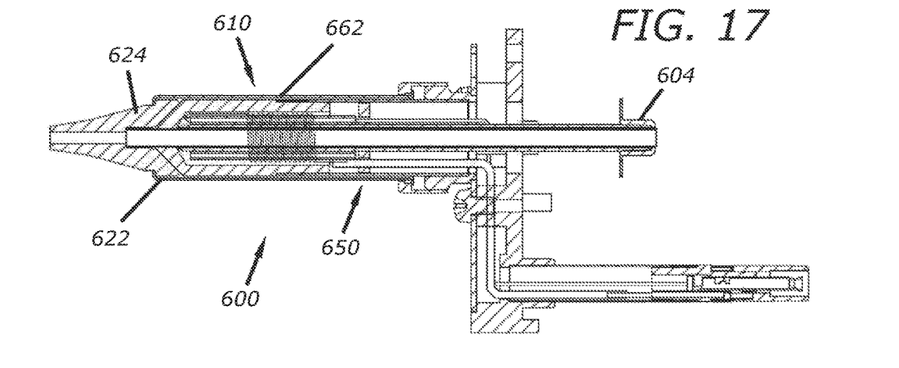
FIG. 17 is a side cross sectional view of a de-soldering assembly using the concepts of the heater-sensor sub-assembly of the present invention.
Figure 18:
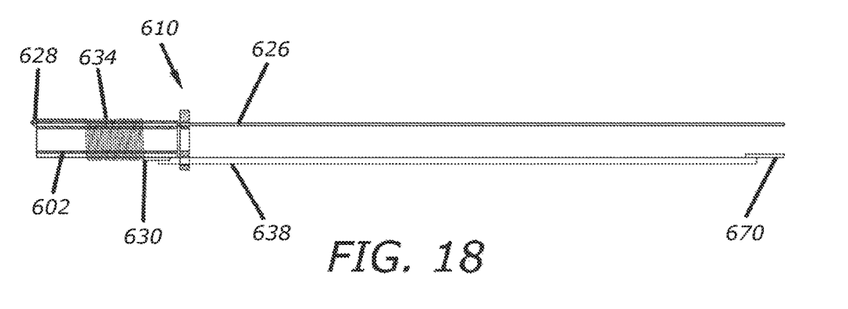
FIG. 18 is side cross sectional view of the heater-sensor sub-assembly of the de-soldering assembly of FIG. 18 according to an embodiment of the present invention.

FIG. 17 and FIG. 18 depict an alternative configuration of the heater-sensor sub-assembly 610 adapted for use in a de-soldering assembly 600. The heater-sensor sub-assembly 610 as depicted in FIG. 17 and FIG. 18 must be adapted to allow solder that is liquefied by the heating tip to pass through a central tube 602 that is connected at its distal end to a negative pressure source or vacuum. Accordingly, the return wire cannot be co-axially mounted within an insulating tube or pipe. Accordingly, as depicted, the heating wire 630 has a coil 634 wrapped around a metallic or ceramic hollow central tube 602. A return wire 626 is preferably a nickel material that may be a flat wire including an insulator laid along the outer circumference of the hollow central tube 602 under the coil 634, extending forward of the distal end of the coil 634 preferably an axial length of between 0.5 to 1 times the axial length of the coil 634.

The heater wire 630 has a distal portion extending from the distal end of the coil 634 which terminates in a connection to the distal end of the return wire 626 to form a thermocouple 628 spaced from the distal end of the coil 634. The heater-sensor sub-assembly 610 is inserted into an axial recess of a heat conducting member 622 which either extends to a nozzle tip 624. Alternatively, the heat conducting member 622 may terminate at its distal end with a flat or cone shaped surface which mates with a similar flat or cone shaped surface at the proximal end of a replaceable nozzle 624. The heat conducting member 622 and nozzle are preferably formed from a high heat conductivity material such as copper or iron. The heat conducting member 622 and a portion of the nozzle 624 are constrained within a housing 662 formed from a low thermal conducting material such as stainless steel.

The coil 634 of the heating wire 630 is preferably formed from an iron-chromium alloy wire having a diameter of 0.3 mm to 0.45 mm. The proximal end of the heating wire may be connected to a conductor 638 of the same material but having a diameter significantly larger than the diameter of the heating wire, for example, the conductor 638 may have a diameter of 0.6 mm to 1.2 mm. The proximal end of the conductor 638 may itself be connected to a connector wire 670 formed of a different material, for example a nickel or nickel alloy material which may have a diameter less than the diameter of the conductor 638. For example, when the conductor 638 has a diameter of 1.2 mm, the connector wire may have a diameter of 0.7 mm. Also, the distal end of the heating wire 630 may be connected to a distal wire (not shown) formed of a similar material but having a diameter larger than that of the heating wire 630.

The de-soldering assembly 600 further includes a base assembly 650 with electrical contacts for the respective return wire 626 and conductor 638 or connector wire 670, to connect them to a power supply (not shown). The proximal end of the central tube 602 has a nipple 604 adapted to be connected to a negative pressure or vacuum (not shown).

Figure 19:
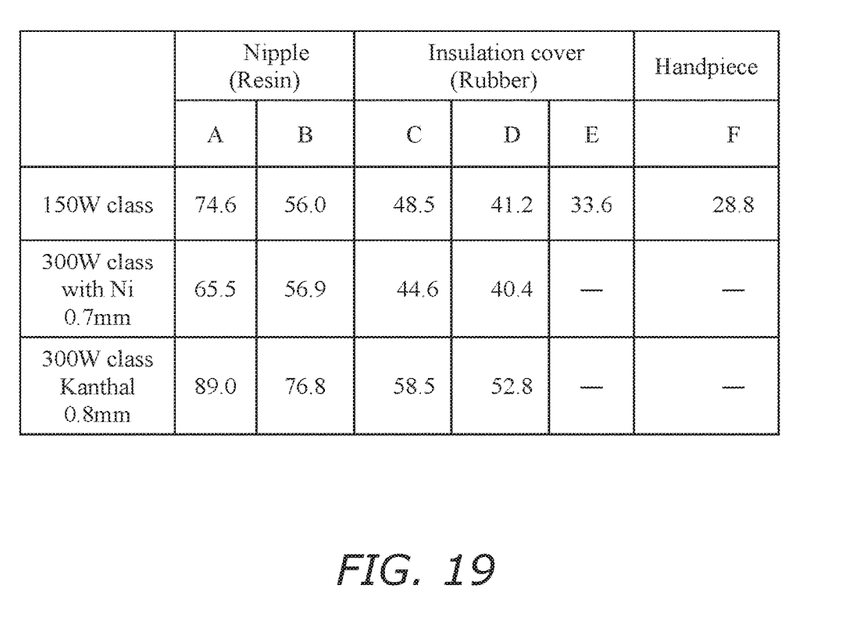
FIG. 19 is a table showing temperature measurements for three different cartridge designs at locations depicted in FIG. 11, where the tip was heated to a temperature of 500° C., and the handle was placed in a holder at a 45° angle.

The configurations of the present invention described above are particularly beneficial in focusing heat generation toward the distal end of the soldering tip (or de-soldering nozzle) and reducing the heating of the handle assembly for high power 300 W soldering systems and for isolating the temperature sensing thermocouple from the heating coil so that the measured temperature more accurately reflects the actual temperature of the soldering tip (or de-soldering nozzle). With respect to minimizing the heat transfer toward the proximal end of the soldering cartridges, referring again to FIG. 11, a standard handle 72 with an associated soldering cartridge 60 is depicted. FIG. 11 also includes the identification of six locations, marked A, B, C, D, E and F where temperature measurements were taken for three different cartridge designs. In each case, the tip was heated to a temperature of 500° C., and the handle was placed in a holder at a 45° angle. The results of the testing are tabulated in the Table of FIG. 19. As reflected in the results of the temperature measurements in the Table of FIG. 19, the addition of the nickel connector wire 70 at the proximal end of the 1.2 mm conductor extending from the heater wire results in a substantial decrease in the temperatures measured at the locations A-D for a 300 W power supply solder cartridge even as compared to using a 0.8 mm iron-chromium alloy material for the connector wire 70. The temperatures for the 300 W cartridge having the nickel connector wire 70 were even less than the temperature measurements of a 150 W cartridge which did not include the nickel connector wire 70.

Figure 20:
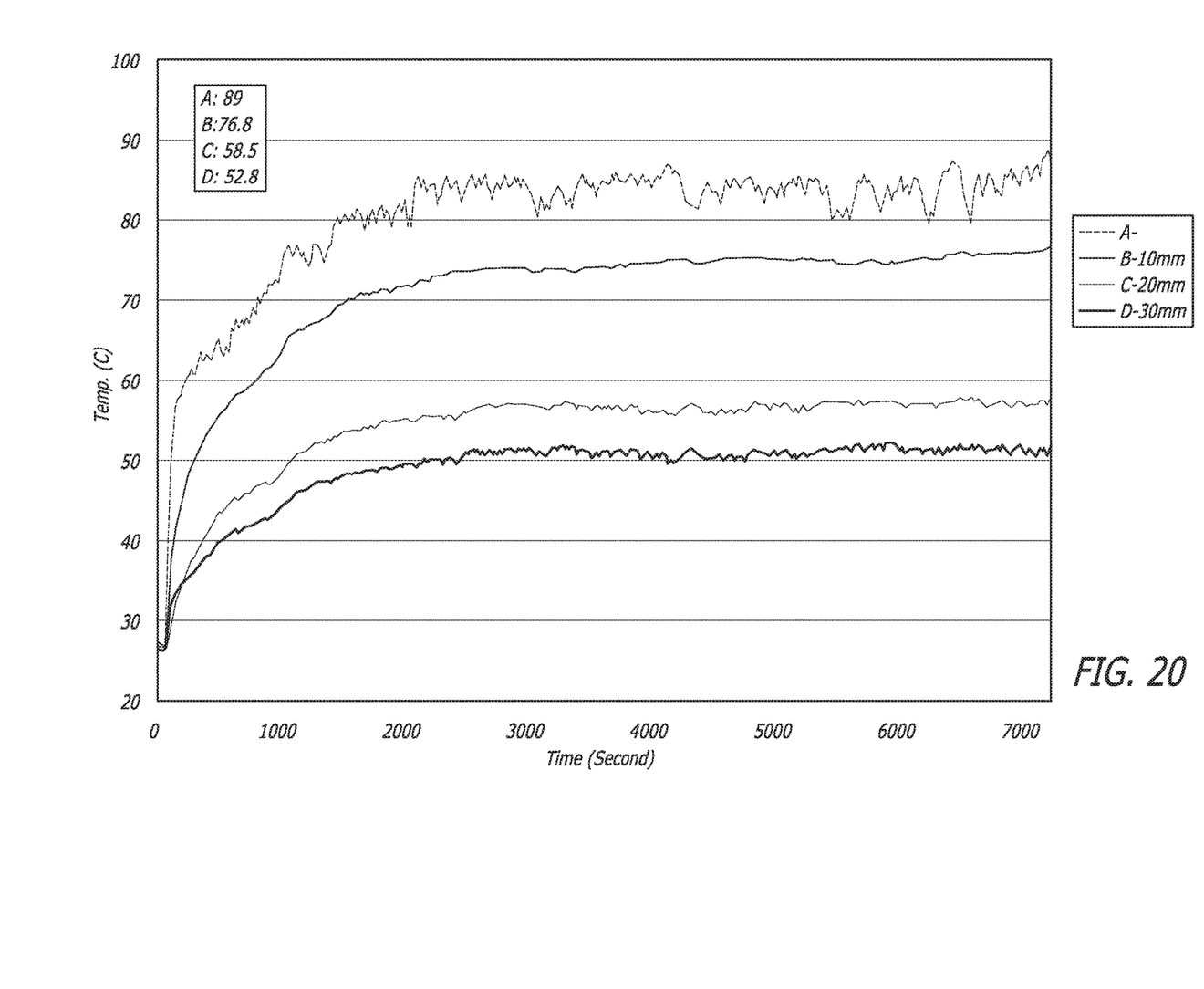
FIG. 20 is a CHART that graphs temperature measurements as a function of time at locations A-D as shown in FIG. 11, graphed for the 300 W solder cartridge with a 0.8 mm iron-chromium alloy connector wire.
Figure 21:
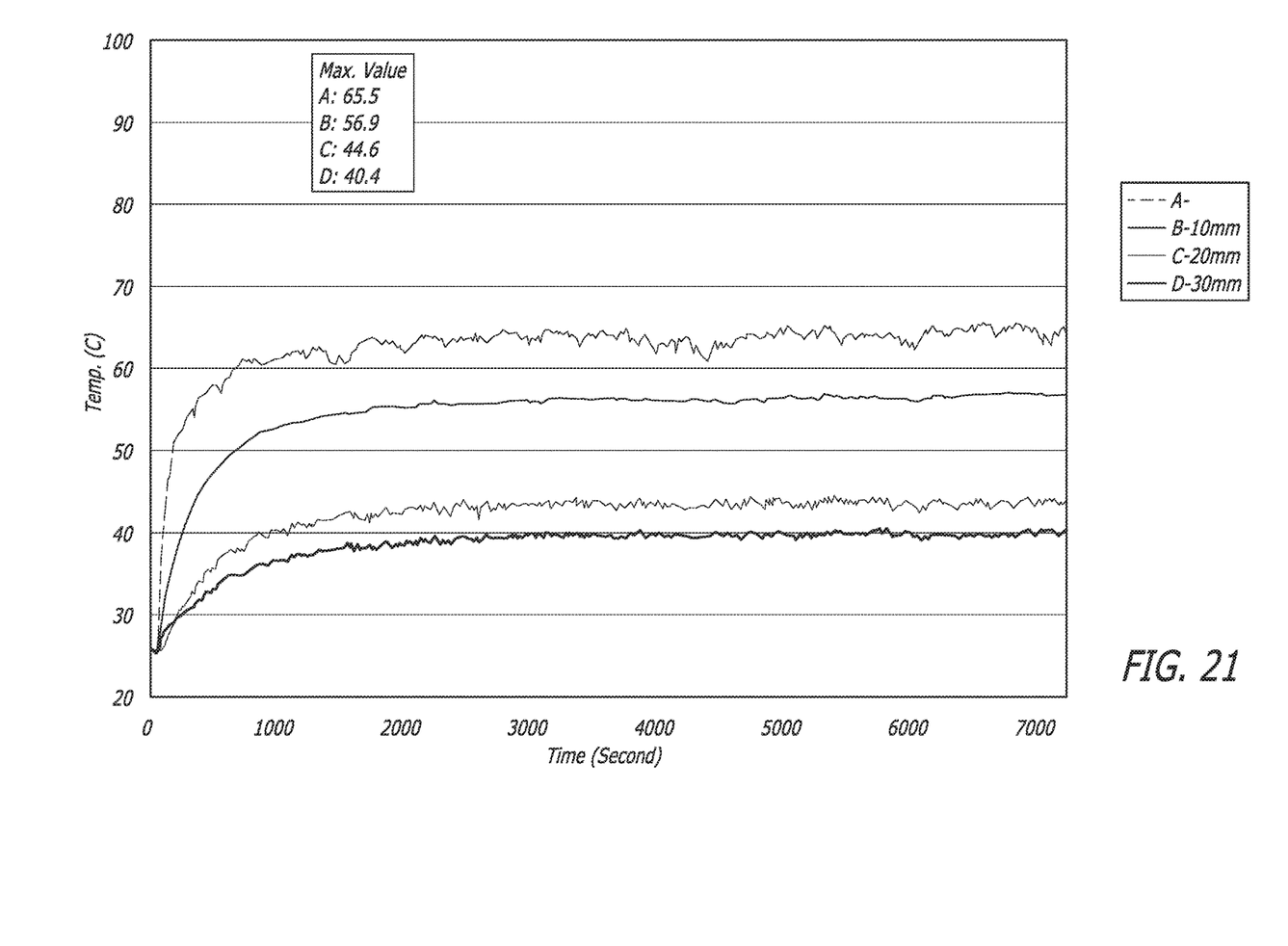
FIG. 21 is a CHART that graphs temperature measurements as a function of time at locations A-D as shown in FIG. 11, graphed for the 300 W solder cartridge with a 0.7 mm nickel connector wire.

The test comparison as between the 300 W solder cartridge with the 0.8 mm iron-chromium alloy connector wire and the 300 W solder cartridge with the 0.7 mm nickel connector wire are further reflected in the appended Charts of FIGS. 20 and 21, which show various temperature measurements as a function of time. In the Chart of FIG. 20, the temperature measurements at locations A-D are graphed for the 300 W solder cartridge with the 0.8 mm iron-chromium alloy connector wire. In the Chart of 21, the temperature measurements at locations A-D are graphed for the 300 W solder cartridge with the 0.7 mm nickel connector wire. As reflected in these graphs, the respective temperatures are all lower for the nickel connector wire designs, demonstrating the advantage of the use of the nickel over the iron-chromium alloy even though the nickel wire has a smaller diameter. These graphs also show that the temperatures stabilize after about 2000 seconds.

Figure 22:
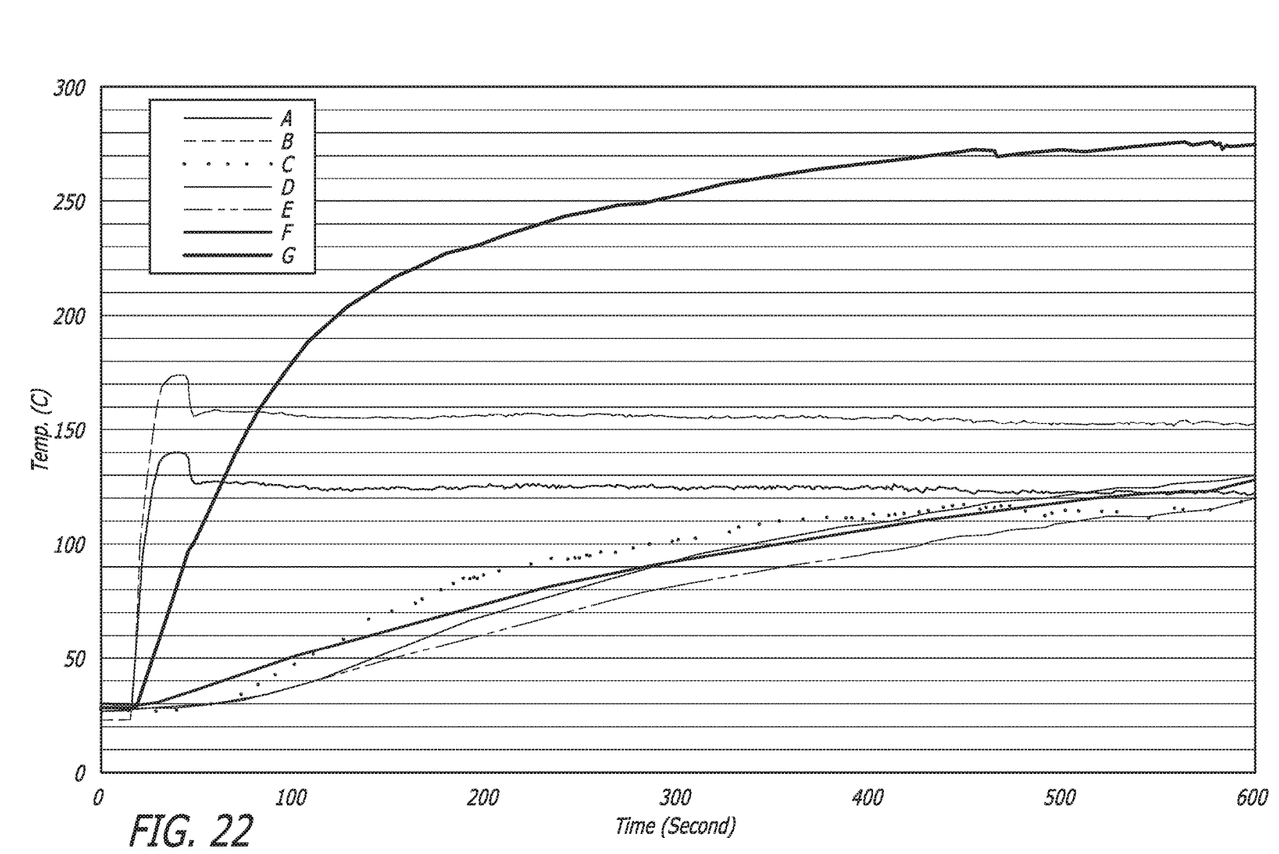
FIG. 22 is a CHART that graphs temperature measurements over time for locations on or inside of the solder cartridges having a configuration as shown in FIGS. 4, 9 for the 300 W solder cartridge with a 0.8 mm iron-chromium alloy connector wire.
Figure 23:
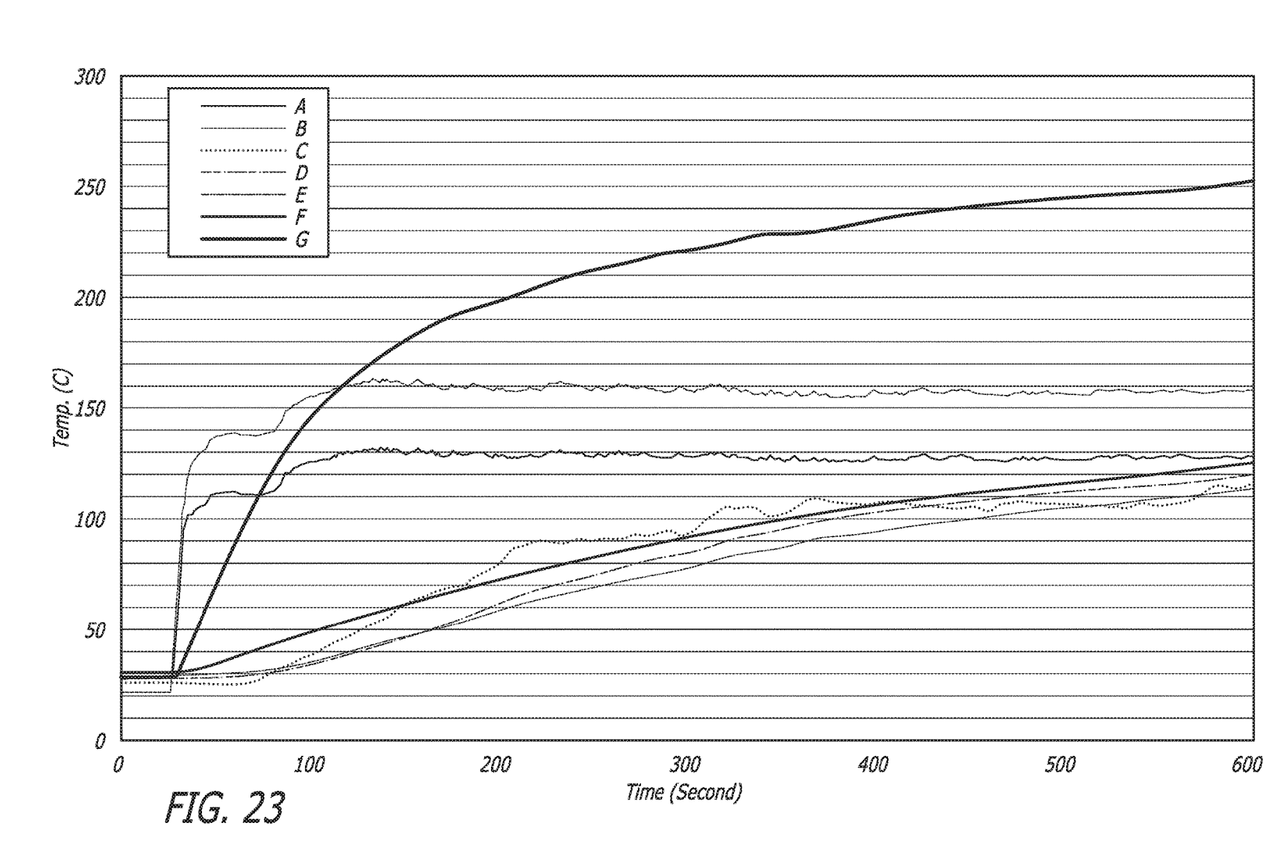
FIG. 23 is a CHART that graphs temperature measurements over time for locations on or inside of the solder cartridges having a configuration as shown in FIGS. 4, 9 for the 300 W solder cartridge with a 0.6 mm nickel connector wire.

To further illustrate the differences as between the 300 W solder cartridge with the 0.8 mm iron-chromium alloy connector wire and the 300 W solder cartridge with the 0.6 mm nickel connector wire, the appended Charts of FIGS. 22 and 23 graph various temperature measurements over time for locations on or inside of the solder cartridges having a configuration as shown in FIGS. 4, 9 and 15. The Charts of FIGS. 22 and 23 are based on measurements taken when the tip of the solder cartridge is placed under water and the desired tip temperature is set to 500° C. for a 300 W solder cartridge. The Chart of FIG. 22 shows the graphs for a solder cartridge having a 0.8 mm diameter iron-chromium alloy connector wire. The Chart of FIG. 23 shows the graphs for a solder cartridge having a 0.6 mm diameter nickel connector wire. The submerged tip temperatures of both cartridges stabilized at about 125° C., as shown in point A. The temperature measurements at various locations along the length of the solder cartridges were similar with the nickel connector wire cartridge generally lower. However, at the location of the joinder of the 1.2 mm iron-chromium alloy conductor to either the 0.8 mm iron chromium alloy connector wire (FIG. 22) or the 0.6 mm nickel connector wire (FIG. 23), the solder cartridge having the nickel connector wire was consistently about 20° C. cooler that the iron-chromium alloy connector wire cartridge as shown in point G.

Those skilled in the art will readily appreciate that the disclosure herein is meant to be exemplary and actual parameters and materials depend upon the specific application for which the process and materials of the present invention are used. The foregoing embodiments are presented by way of example such that the scope of the invention is defined only by the appended claims.

The invention claimed is:

1. A heater-sensor sub-assembly adapted for use in a soldering system comprising:
   an insulating pipe;
   a heating wire made of first metallic material having proximal end portion, a central winding portion wrapped around said insulating pipe and a distal end portion;
   a first non-heating wire made of the same first metallic material as said heating wire, said non-heating wire connected to the proximal end of said heating wire;
   a second non-heating wire made of a second metallic material, said non-heating wire having a proximal end and a distal end with at least a portion of said non-heating wire extending axially through said insulating pipe;
a thermocouple formed by connecting said distal end of said heating wire made of said first metallic material connected to a distal end of said second non-heating wire made of said second metallic material; and
a third non-heating wire connected to a proximal end of said first non-heating wire, said third non-heating wire made from a metallic material selected from the group consisting of a metallic material having a lower volume resistivity than said first non-heating wire and a metallic material identical to said second non-heating wire.

2. The heater-sensor sub-assembly of claim 1, further comprising:
an iron-chromium alloy material as said first metallic material; and
a nickel or nickel alloy material as said second metallic material.

3. The heater-sensor sub-assembly of claim 1, wherein said first non-heating wire has a diameter 2 to 4 times greater than a diameter of said heating wire.

4. The heater-sensor sub-assembly of claim 1, wherein said first non-heating wire has a diameter 2 to 4 times greater than a diameter of said heating wire and said third non-heating wire has a diameter less than the diameter of said first non-heating wire.

5. The heater-sensor sub-assembly of claim 1, wherein said central winding portion of said heating wire covers about one half of a length of said insulating pipe and said central winding portion is centered on said insulating pipe whereby said central winding portion is spaced from said thermocouple.

6. The heater-sensor sub-assembly of claim 1, further comprising:
a fourth non-heating wire made from the same material as said heating wire and connected between said distal end of said heating wire and said thermocouple.

7. The heater-sensor sub-assembly of claim 1, wherein said first non-heating wire has a diameter of 1.0 mm to 1.2 mm, said heating wire has a diameter of 0.2 mm to 0.45 mm, and said third non-heating wire has a diameter less than 0.8 mm.

8. The heater-sensor sub-assembly of claim 1, wherein said central winding portion of said heating wire has an axial length of 8 mm to 20 mm and a distal end of said central winding portion is spaced at least 4 mm from said thermocouple.

9. The heater-sensor sub-assembly of claim 1, wherein said insulating pipe has an axial length of about 35 mm to 40 mm and the axial length of said central winding portion of said heating wire has an axial length of about 19 mm with a distal end of the central winding portion of said heating wire positioned about 10 mm proximally from said thermocouple.

10. A heater-sensor sub-assembly adapted for use in a de-soldering system comprising:
a hollow central tube;
a heating wire made of first metallic material having proximal end portion, a central winding portion wrapped around said hollow central tube and a distal end portion;
a non-heating conductor made of the same first metallic material as said heating wire, said non-heating conductor connected to the proximal end of said heating wire;
a non-heating wire made of a second metallic material, said non-heating wire having a proximal end and a distal end with at least a portion of said non-heating wire lying on said hollow central tube extending under said central winding portion of said heating wire;
a thermocouple formed by connecting said distal end of said heating wire made of said first metallic material to a distal end of said non-heating wire made of said second metallic material; and
a second non-heating wire connected to a proximal end of said non-heating conductor, said second non-heating wire made from a metallic material selected from the group consisting of a metallic material having a lower volume resistivity than said non-heating conductor and a metallic material identical to said second non-heating wire.

11. A heater-sensor sub-assembly adapted for use in a soldering or de-soldering system, comprising:
a heating wire made of first metallic material having a diameter of 0.2 mm to 0.45 mm, a proximal end of said heating wire connected to a non-heating conductor made of the same first metallic material, said non-heating conductor having a diameter of 1.0 mm to 1.2 mm;
a non-heating return wire made of a second metallic material;
a thermocouple formed by connecting a distal tip end of said heating wire to a distal tip end of said non-heating return wire; and
said heating wire further comprising a coil portion a distal end of which is spaced at least 5 mm proximally from said thermocouple.

12. A solder cartridge for use in a soldering system comprising:
a high thermal mass soldering tip;
a housing a distal end of which is secured to said soldering tip and a proximal end including at least two electrical contacts;
a heater-sensor sub-assembly mounted within said housing, said heater-sensor sub-assembly comprising:
an insulating pipe;
a heating wire made of first metallic material having proximal end portion, a central winding portion wrapped around said insulating pipe and a distal end portion;
a non-heating conductor made of the same first metallic material as said heating wire, said non-heating conductor connected to the proximal end of said heating wire;
a first non-heating wire made of a second metallic material, said first non-heating wire having a proximal end coupled to one of said electrical contacts of said housing and a distal end with at least a portion of said first non-heating wire extending axially through said insulating pipe;
a thermocouple formed by connecting said distal end of said heating wire made of said first metallic material connected to a distal end of said first non-heating wire made of said second metallic material; and
a second non-heating wire connected to a proximal end of said non-heating conductor, said second non-heating wire made from the a metallic material selected from the group consisting of a metallic material having a lower volume resistivity than said first non-heating conductor and a metallic material identical to said first non-heating wire.

13. The solder cartridge of claim 12, wherein said non-heating conductor has a diameter 2 to 4 times greater than a diameter of said heating wire and said second non-heating wire has a diameter less than the diameter of said non-heating conductor.

14. The solder cartridge of claim 12, wherein said central winding portion of said heating wire covers about one half of a length of said insulating pipe and said central winding portion is centered on said insulating pipe whereby said central winding portion is spaced from said thermocouple.

15. The solder cartridge of claim 12, further comprising:
   a third non-heating wire made from the same material as said heating wire and connected between said distal end of said heating wire and said thermocouple.

16. The solder cartridge of claim 12, wherein said non-heating conductor has a diameter of 1.0 mm to 1.2 mm, said heating wire has a diameter of 0.2 mm to 0.45 mm, and said second non-heating wire has a diameter less than 0.8 mm.

17. The solder cartridge of claim 12, wherein said central winding portion of said heating wire has an axial length of 8 mm to 20 mm and a distal end of said central winding portion is spaced at least 4 mm from said thermocouple.

18. The solder cartridge of claim 12, wherein said non-heating conductor has a diameter of 1.2 mm, said heating wire has a diameter of 0.2 mm to 0.45 mm, said second non-heating wire has a diameter less than 0.8 mm and said central winding portion of said heating wire has an axial length of 8 mm to 20 mm and a distal end of said central winding portion is spaced at least 4 mm from said thermocouple.

19. The solder cartridge of claim 12, wherein said insulating pipe has an axial length of about 35 mm to 40 mm and the axial length of said central winding portion of said heating wire has an axial length of about 19 mm with a distal end of the central winding portion of said heating wire positioned about 10 mm proximally from said thermocouple.

20. The solder cartridge of claim 12, wherein said high thermal mass soldering tip comprises: a first sleeve portion; a central portion; and a tip end, said soldering tip having an axial bore extending through said first sleeve portion, said central portion and into a portion of said tip end to receive said heater-sensor sub-assembly.

* * * * *